COFFEE MAKING MACHINE

Original Filed Sept. 8, 1959 7 Sheets-Sheet 1

INVENTOR.
George R. Bunn,
BY
Robert R. Lockwood
Atty

Oct. 13, 1964 G. R. BUNN Re. 25,663

COFFEE MAKING MACHINE

Original Filed Sept. 8, 1959 7 Sheets-Sheet 2

INVENTOR.
George R. Bunn,
BY
Robert R. Lockwood
Atty

COFFEE MAKING MACHINE

Original Filed Sept. 8, 1959 7 Sheets-Sheet 3

INVENTOR.
George R. Bunn,
BY
Robert R. Lockwood
Atty

COFFEE MAKING MACHINE

Original Filed Sept. 8, 1959 7 Sheets-Sheet 4

INVENTOR.
George R Bunn,
BY
Robert R. Lockwood
atty

COFFEE MAKING MACHINE
Original Filed Sept. 8, 1959 7 Sheets-Sheet 5
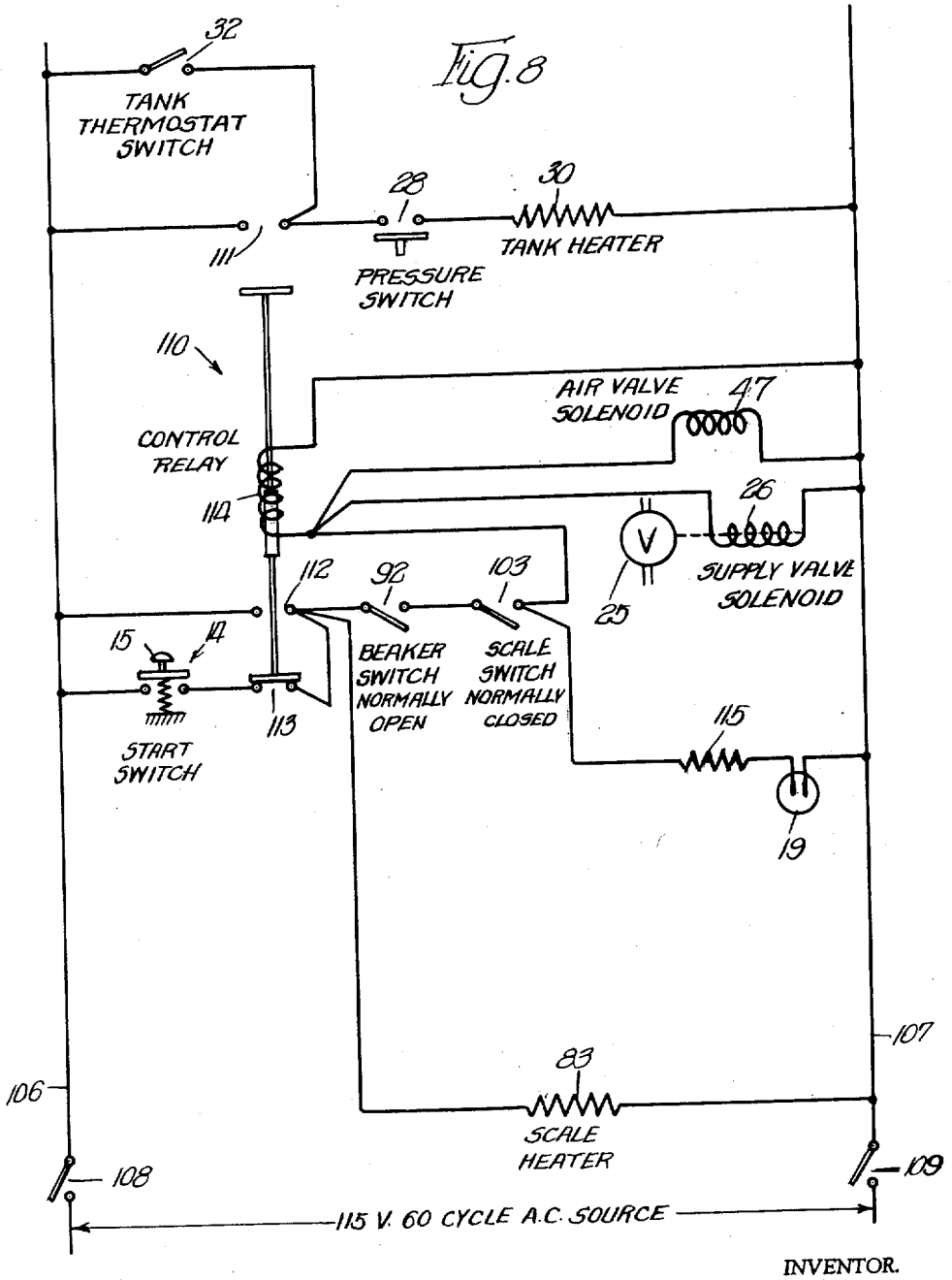
INVENTOR.
George R. Bunn,
BY
Robert R. Lockwood
Atty

COFFEE MAKING MACHINE

Original Filed Sept. 8, 1959 7 Sheets-Sheet 6

INVENTOR.
George R. Bunn,
BY
Robert R. Lockwood
Atty.

COFFEE MAKING MACHINE

Original Filed Sept. 8, 1959 7 Sheets-Sheet 7

INVENTOR.
George R. Bunn,
BY
Robert R. Lockwood
Attys.

United States Patent Office

Re. 25,663
Reissued Oct. 13, 1964

25,663
COFFEE MAKING MACHINE

George R. Bunn, Springfield, Ill., assignor, by mesne assignments, to Bunn-O-Matic Corporation, Springfield, Ill., a corporation of Delaware Original No. 3,034,417, dated May 15, 1962, Ser. No. 839,047, Sept. 8, 1959. Application for reissue Sept. 16, 1963, Ser. No. 309,919
26 Claims. (Cl. 99—282)

Matter enclosed in heavy brackets [ ] appears in the original patent but forms no part of this reissue specification; matter printed in italics indicates the additions made by reissue.

This invention relates, generally, to coffee making machines and it has particular relation to automatic coffee making machines for use in industrial plants, hospitals, restaurants and the like. This application is a continuation-in-part of application Serial No. 725,813 filed April 2, 1958, now abandoned.

Among the objects of this invention are: To provide for automatically making predetermined amounts of coffee in rapid succession and on a continuous basis; to maintain a supply of hot water on a stand-by basis for use in making coffee; to provide direct communication between a tank containing the hot water and the atmosphere except when water is being drawn from the tank for coffee making purposes; to spray the hot water over a body of ground coffee located in a funnel by means of a spray head positioned above the funnel; to collect the coffee in a beaker below the funnel; to start a coffee making cycle by placing an empty beaker underneath the funnel; to stop the coffee making cycle when a predetermined quantity of coffee has flowed into the beaker; to support the beaker on scale means for starting and stopping the coffee making cycle; to heat the coffee in the beaker; to apply heat to the water in the tank while hot water is being drawn therefrom for coffee making purposes; to prevent dripping of the hot water from the spray head after the coffee making cycle has been completed; to siphon the final quantity of water that is sprayed over the coffee from a surge chamber by opening the chamber to the atmosphere; to provide the surge chamber separate from or as a part of the water tank; to prevent the application of heat to the water in the tank when the water pressure is below a predetermined pressure; to provide direct communication between the tank and the atmosphere at all times whether or not water is being drawn therefrom; to provide this direct communication with the atmosphere at a location above the level at which the hot water is sprayed over the ground coffee; to accomplish the direct communication by a siphon tube that extends above the connection between the tank and the spray head and opens to the atmosphere over the funnel; to prevent condensation of moisture on the hood adjacent the spray head by maintaining it at an elevated temperature; to prevent dripping of coffee from the funnel after it is removed from operative position on the hood; to provide a self sealing valve at the bottom of the funnel for this purpose that is automatically closed when the funnel is removed and is automatically opened when the funnel is placed in operative position on the hood; to stop the coffee making cycle a predetermined time after it is initiated; and to employ a timer for this purpose that is initiated in operation by manually starting the coffee making cycle.

Other objects of this invention will, in part, be obvious and in part appear hereinafter.

This invention is disclosed in the embodiments thereof shown in the accompanying drawings and it comprises the features of construction, combination of elements and arrangement of parts that will be exemplified in the constructions hereinafter set forth the scope of the application of which will be indicated in the appended claims.

For a more complete understanding of the nature and scope of this invention reference can be had to the following detailed description, taken together with the accompanying drawings, in which:

FIGURE 8 illustrates, diagrammatically, the electrical connections that can be employed in practicing this invention;

Figure 1:
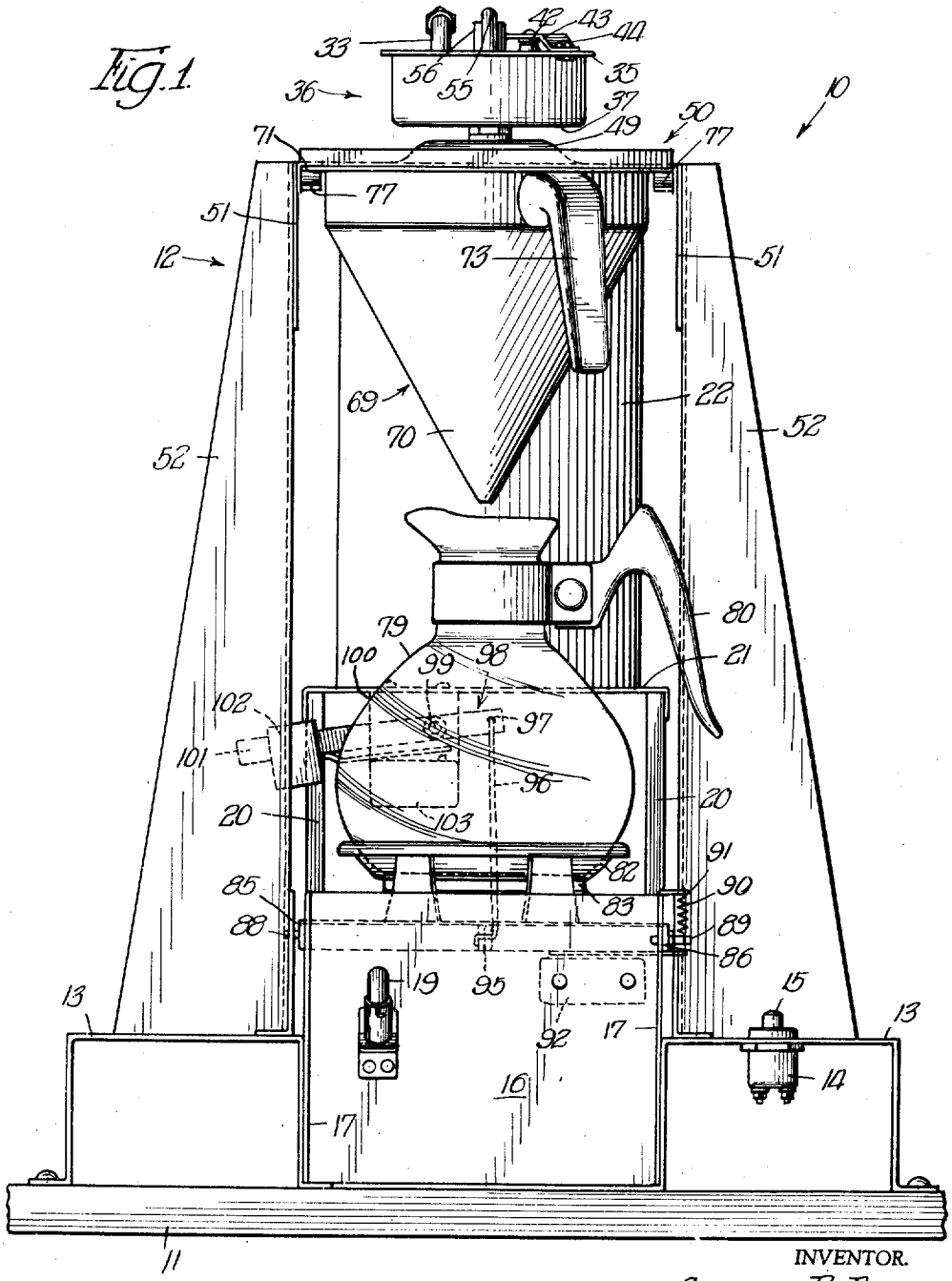
FIGURE 1 is a view, in front elevation, of an automatic coffee making machine in which this invention is embodied.
Figure 2:
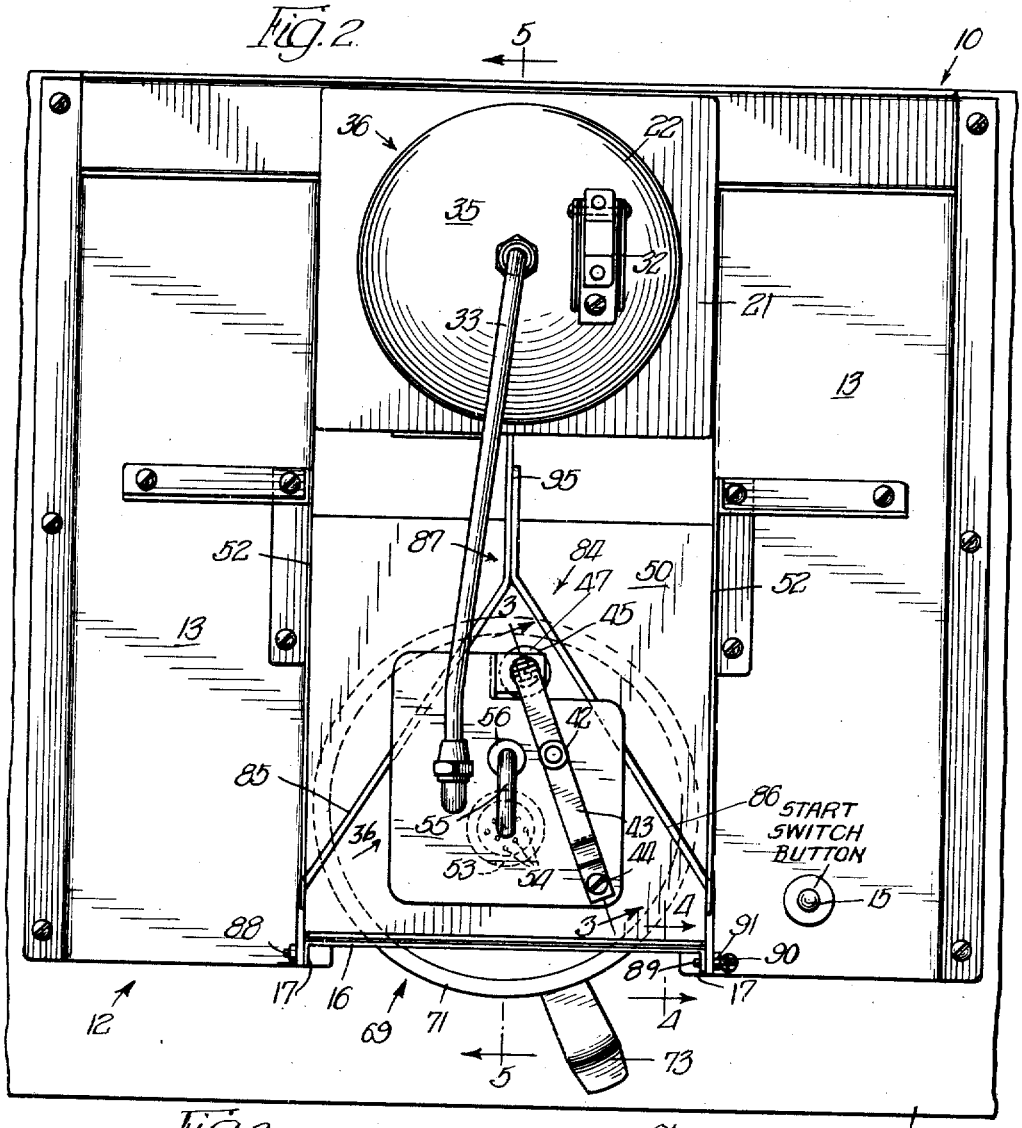
FIGURE 2 is a top plan view of the coffee making machine shown in FIGURE 1.
Figure 5:
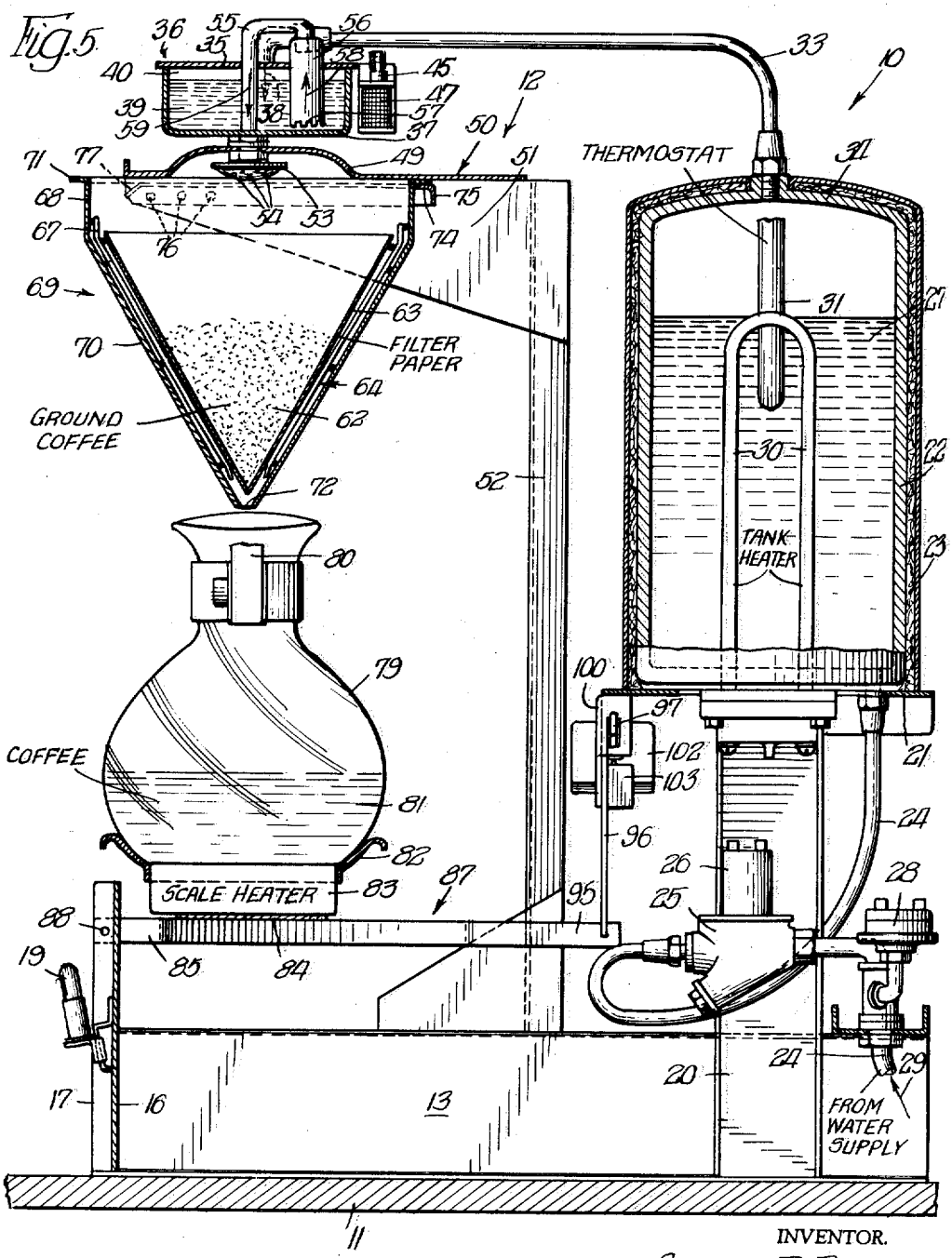
FIGURE 5 is a vertical sectional view taken generally along the line 5—5 of FIGURE 2.

Referring now particularly to FIGURES 1, 2 and 5 of the drawings, it will be observed that the reference character 10 designates, generally, an automatic coffee making machine. The machine 10 can be mounted on a support plate 11 which may be a counter top or like support as will be understood readily. Suitably secured to the support plate 11 is a frame that is indicated, generally, at 12. The frame 12 preferably is fabricated from sheet steel members that may be suitably painted. Obviously many forms of frame construction can be employed. Further, for decorative and safety purposes, the frame 12 can be enclosed within a suitable hood or other barrier. However, in order to illustrate more clearly the details of construction of the invention such a hood or barrier has been omitted.

The frame 12 may include a pair of inverted channel members 13 which can be supported directly on the support plate 11 as shown. Secured to one of the channel members 13 there is a start switch 14 which includes a push button 15 that can be operated manually to close the normally open contacts for initiating a coffee making cycle in a manner to be described hereinafter. The push button 15 and start switch 14 can be located in any convenient place, the mounting thereof on one of the channel members 13 having been chosen for convenience.

Figure 4:
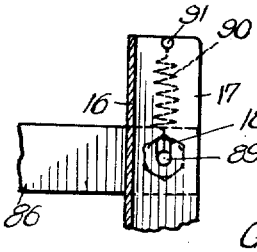
FIGURE 4 is a vertical sectional view, at an enlarged scale, taken generally along the line 4—4 of FIGURE 2.

Between the channel members 13 and forming a part of the frame 12 is a front panel 16 having forwardly extending flanges 17. As shown in FIGURE 4, one of the flanges 17 is provided with a vertically extending slot 18 the purpose of which will be set forth hereinafter.

Since it is desirable that a visual indication be given that the machine 10 is in operation an indicating lamp 19, preferably a neon lamp, is mounted on the front panel 16. It will be described hereinafter how the indicating lamp 19 is energized during the cycle of automatic operation of the coffee making machine 10.

As shown more clearly in FIGURE 5 of the drawings upright channel supports 20 are provided at the rear of the machine 10 for carrying a platform 21 at the top. Mounted on the platform 21 is a water tank 22 which may be surrounded by a layer 23 of insulation. It will be understood that water in the water tank 22 is maintained at an elevated temperature and it is for this reason that the layer 23 of insulation is provided. Water to the water tank 22 can be supplied through an intake water line 24 which is connected to a suitable source of water under pressure. The flow of water through the intake water line 24 to the water tank 22 is controlled by a water supply valve 25 which is arranged to be operated on energization of a water supply valve solenoid 26. Since the water supply valve 25 and its solenoid 26 are of conventional construction, the details of which form no part of this invention, such details are not shown or described herein other than to illustrate the solenoid 26 diagrammatically in FIGURE 8. Since it is desirable that no heat be supplied to water 27 in the water tank 22 in the event that the pressure from the supply is below a predetermined value, a pressure switch 28 is employed having contacts that are closed when the water pressure is above a predetermined value. The control for the pressure switch 28 is obtained by a direct connection to the water intake line 24 as shown. On energization of the water supply valve solenoid 26 and opening of the water supply valve 25, water flows, as indicated by the arrow 29 from the water supply through the intake water line 24 into the water tank 22.

In order to heat the water 27 in the water tank 22 so that a substantial quantity of it will be available on a stand-by basis for coffee making purposes, an electric tank heater 30 is located within the water tank 22 as shown. The electric tank heater 30 is of conventional construction well known to those skilled in the art. The operation of the electric tank heater 30 is controlled by a thermostat 31, also of conventional construction, which may be located in the upper part of the water tank 22 and arranged to operate a tank thermostat switch 32, FIGURE 2, to close the contacts thereof and complete a circuit for connecting the electric tank heater 30 for energization to a suitable current source when the temperature of the water 27 in the tank 22 falls below a predetermined temperature.

The water from the water tank 22 flows out of the top through a discharge water line 33. As shown in FIGURE 5 it will be observed a discharge water line 33 interconnects the top 34 of the water tank 22 and a top 35 of a surge chamber, shown generally at 36, which is located in spaced relation to the water tank 22 and has a bottom 37 which is located above the top 34 of the water tank 22. Hot water from the discharge water line 33 flows into the surge chamber 36 as indicated by the arrow 38. During the coffee making cycle the surge chamber 36 is closed so that hot water, indicated at 39, fills the principal part of it leaving an air space 40 at the top.

Figure 3:
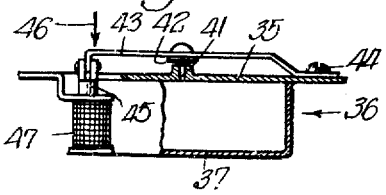
FIGURE 3 is a vertical sectional view taken generally along the line 3—3 of FIGURE 2.

It is desirable that provision be made for siphoning the water 39 from the surge chamber 36 at the end of the coffee making cycle. For this purpose an air vent 41, FIGURE 3, is provided in the top 35 of the surge chamber 36 and it is arranged to be closed by an air valve 42 which is carried by a resilient arm 43 that is secured at 44 to the top 35 at one end. At the other end the resilient arm 43 is provided with an armature 45 that is arranged to be attracted downwardly in the direction indicated by the arrow 46 on energization of an air valve solenoid 47.

Referring again to FIGURE 5 of the drawings, it will be noted that an upwardly deformed portion 49 of a hood, shown generally at 50, is located directly underneath the surge chamber 36. The hood 50 has depending sides 51 which are secured to and carried by frame uprights 52, which form a part of the frame 12, and are secured to the inverted channel members 13 at their lower ends. Positioned within the deformed portion 49 of the hood 50 is a spray head 53 that is provided with spray openings 54 which are arranged to spray hot water downwardly and outwardly over a substantial area. It will be observed that the spray head 53 is positioned at the lower end of an auxiliary discharge water line 55 which extends centrally upwardly through the surge chamber 36 and is connected at the upper end of an enlarged intake section 56 which projects downwardly through the top 35 and close to the bottom 37 of the surge chamber 36. The lower end of the enlarged intake section 56 is provided with notches 57 to facilitate the flow of water upwardly, as indicated by the arrow 58, through the enlarged intake section 56 and then downwardly, as indicated by the arrow 59, to the spray head 53.

The auxiliary discharge water line 55 with the enlarged intake section 56 functions as a siphon on cessation of flow of hot water from the water tank 22 through the discharge water line 33. While the hot water is flowing into the surge chamber 36 from the discharge water line 33, the air vent 41 is closed. The hot water then sprays out of the openings 54 in the spray head 53. At the end of the cycle, the air valve 42 is opened and the air space 40 is placed in communication with the atmosphere through the air vent 41. Although water has ceased to flow through the discharge water line 33, the water 39 in the surge chamber 36 continues to flow since the auxiliary discharge water line 55 and enlarged intake section 56 act as a siphon. As a result, as soon as the level of the water 39 in the surge chamber 36 is lowered to a level below the upper ends of the notches 57, no further flow of water takes place through the auxiliary discharge water line 55 and, consequently, there is no dripping of water from the spray head 53.

Figure 6:
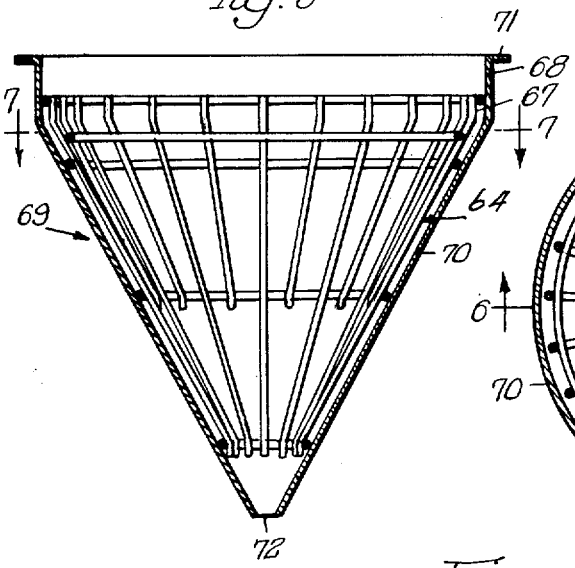
FIGURE 6 is a vertical sectional view, at an enlarged scale, of the removable funnel provided with a resilient wire grill, the funnel being shown in FIGURE 1 and FIGURE 5, FIGURE 6 being a vertical sectional view taken generally along the line 6—6 of FIGURE 7.
Figure 7:
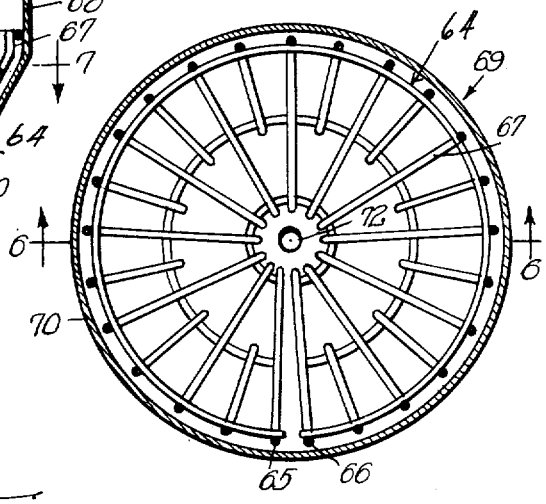
FIGURE 7 is a horizontal sectional view taken generally along the line 7—7 of FIGURE 6.

The hot water during the coffee making cycle sprays over ground coffee 62 a quantity of which is positioned in the lower end of a disposable conical filter 63, preferably formed of one or more layers of filter paper. The filter 63 is located centrally underneath the spray head 53 and it is supported on a resilient conical wire grill 64 the details of construction of which are shown more clearly in FIGURES 6 and 7 of the drawings. As there shown, the wire grill 64 is formed of various lengths of wire which extend in spaced relation lengthwise of the conical surfaces thereof and are secured together in spaced relation by circularly extending wire supports. Preferably the wire grill 64 is formed of stainless steel or like material. It is resilient and flexible and has spaced longitudinally extending sides 65 and 66 which can be moved toward each other for a purpose that will be apparent presently. The wire grill 64 is of conical shape for the lower principal part and it has a cylindrical top section 67 for interfitting with a cylindrical upper end 68 of a funnel, shown generally at 69, which has a conical body portion 70, a radial flange 71 around the upper periphery and a discharge opening 72 at the bottom. Since the wire grill 64 is resilient and the sides 65 and 66 are spaced apart, the wire grill 64 can be reduced slightly in size by bringing the sides 65 and 66 toward each other for insertion in the funnel 69. On release of the wire grill 64, because of its resiliency, it is frictionally gripped by the inner surface of the conical body portion 70 and the inner surface of the cylindrical upper end 68. Even though the funnel 69 is turned upside down to permit the removal of the filter 63 and spent coffee grounds, the wire grill 64 remains in place.

As shown more clearly in FIGURE 5 of the drawings, the filter 63 is spaced by the resilient conical wire grill 64 from the inner surface of the conical body portion 70 of the funnel 69. As a result of this spacing the filter 63 does not become clogged but rather the flow therethrough of filtered liquid can take place over a relatively large area with the result that the time required for water to pass through the funnel 69 is reduced to a minimum. The construction and arrangement of the filter paper 63, wire grill 64 and funnel 69 are claimed in application Serial No. 814,877, filed May 21, 1959, now abandoned.

As shown in FIGURE 1, the funnel 69 is provided with a handle 73 to facilitate removal from and application to the frame 12. The funnel 69 is supported by its radial flange 71 overlying a flange 74, FIGURE 5, of an arcuate support 75 that is secured by rivets 76 to the depending sides 51 of the hood 50. Since the flange 74 is spaced below the central portion of the hood 50 a distance slightly greater than the thickness of the flange 71 on the funnel 69, the latter can be inserted and removed as will be understood. In order to facilitate the application of the funnel 69 to the hood 50, the outer ends 77, FIGURE 1, of the flanges 74 are turned downwardly.

The coffee that is formed as the result of the spraying of hot water over the ground coffee 62 in the funnel 69 flows downardly through the discharge opening 72 into a beaker 79 that is located therebelow. The beaker 79 may be a conventional glass beaker provided with a handle 80. The coffee appears therein as indicated at 81. The beaker 79 is positioned on an annular rim 82 that surrounds a scale heater 83. The scale heater 83 is employed to maintain the coffee 81 in the beaker 79 at an elevated temperature during the coffee making cycle. Provision is made, as will appear hereinafter, for energizing the scale heater 83 only during the time that the coffee making cycle is being performed.

The beaker 79 supported on the annular rim 82 and scale heater 83 is further supported by a transversely extending plate 84 underneath the scale heater 83. The plate 84 extends between and is secured to arms 85 and 86 of a bifurcated end of a scale beam that is indicated, generally at 87. The bifurcated arrangement of the arms 85 and 86 is shown more clearly in FIGURE 2. The arm 85, at the extreme outer end, is mounted by a pivot pin 88 on one of the flanges 17 of the front panel 16 while the other arm 86 is mounted by a pivot pin 89 which extends through the slot 18 referred to previously. Thus, the arm 86 of the scale beam 87 is mounted for both pivotal and sliding movement by the slot 18. A relatively light tension spring 90 interconnects the pivot pin 89 and a connection 91 at the upper end of the associated flange 17. In the absence of the beaker 79, the spring 90 biases the pivot pin 89 and thereby the arm 86 of the scale beam 87 upwardly to the upper end of the slot 18. When the beaker 79 is placed empty on the scale heater 83, the added weight is sufficient to overcome the spring 90 and to cause the arm 86 of the scale beam 87 to move downwardly until the pivot pin 89 engages the lower end of the slot 18. When this takes place contacts of a beaker switch 92, mounted on the rear of the front panel 16, as shown in FIGURE 1, are closed as a result of downward movement of the arm 85 of the scale beam 87 as permitted by the slot 18 through which the pin 89 extends to permit the initiation of the coffee making cycle in a manner to be described hereinafter.

As shown in FIGURES 1 and 5 of the drawings, the other end 95 of the scale beam 87 is supported by a link 96 from one end 97 of a lever 98 which is pivoted at 99 intermediate its ends on a transverse plate 100 which is carried by the front side of and depends from the platform 21. At its other end 101 the lever 98 carries an adjustable weight 102 which functions to bias the other end 95 of the scale beam 87 upwardly against the downward force exerted by the beaker 79, annular rim 82, scale heater 83 and the varying amount of coffee 81 in the beaker 79. When a predetermined quantity of coffee 81 has flowed into the beaker 79, the for exerted downwardly on the scale beam 87 by it in adc tion to the other forces, previously referred to, is suf cient to rock the lever 98 from the position shown FIGURE 1 to an alternate position for opening co tacts of a scale switch 103 which is mounted on tl transverse plate 100. As the result of the opening the contacts of the scale switch 103, the water supp valve solenoid 26 is deenergized and water supply val 25 is closed. No further water flows into the wat tank 22. However, the hot water 39 in the sur chamber 36 is siphoned out in the manner describ and the coffee continues to flow from the discharge ope ing 72 of the funnel 69 for a limited period.

FIGURE 8 shows the electrical connections that can employed in practicing the invention. It will be observ that line conductors 106 and 107 are arranged to be co nected by line switch 108 and 109 to a suitable sour of current such as 115 volt 60 cycle alternating curre source. Preferably a control relay, shown generally 110, is employed for performing certain operations. Tl control relay 110 includes a first set of normally op contacts 111 which are connected in shunt with the co tacts of the tank thermostat switch 32 for the purpo of making certain that the tank heater 30 is energiz during the coffee making cycle in order to maintain tl water 27 in the water tank 22 at the required temper ture which might not be retained if reliance were plac solely on the thermostat 31. The control relay 110 i cludes a second set of normally open contacts 112 whi function as holding contacts and a third set of normal closed contacts 113. The control relay 110 is provid with an operating wind 114. It will be observed th the supply valve solenoid 26, air valve solenoid 47 a operating winding 114 are connected in parallel circ relation and to the line conductor 107. They are a ranged to be connected through the contacts of the sca switch 103 which are normally closed, the contacts the beaker switch 92, which are closed only when tl beaker 79 is placed in operative position under the fu nel 69, through the third set of normally closed conta 113 of the control relay 110 and the contacts of the st switch 14 when the push button 15 is depressed to t line conductor 106. In parallel with the supply val solenoid 26 and the other elements in parallel therewi is a resistor 115 in series with the neon indicating lamp 1

In describing the operation of the automatic coff making machine 10, it will be assumed that a measur amount of ground coffee 62 has been placed in the low portion of the filter 63 and that the funnel 69 has be placed in position as shown in FIGURE 5 of the dra ings. In addition it will be assumed that the water pr sure is sufficient to hold the contacts of the pressu switch 28 closed and that the line switches 108 and 1 have been closed to energize line conductors 106 and 1 Under these assumed conditions the thermostat 31 w function to close and open the contacts of tank therm stat switch 32 for the purpose of maintaining the wat 27 in the water tank 22 at the desired temperature. U der these assumed conditions the air valve solenoid is deenergized and the surge chamber 36 is open to t atmosphere through the air vent 41. Thus the system in effect an open system and pressure cannot build up the water tank 22.

Next it will be assumed that an empty beaker 79 h been placed on the scale heater 83. This causes t contacts of the beaker switch 92 to be closed. Now t cycle can be initiated by the operator depressing the pu button 15 and closing the contacts of the start switch 1 The operating winding 114 of the control relay 110 energized, contacts 113 are opened, and holding conta 112 are closed to maintain the operating winding 1 energized. Contacts 111 are closed to shunt the conta of the tank thermostat switch 32 and insure that the ta heater 30 is energized.

he scale heater 83 is energized and, since the contacts he beaker switch 92 are closed and the contacts of the e switch 103 are closed, the neon indicating lamp 's illuminated, supply valve solenoid 26 is energized likewise air valve solenoid 47 is energized. As a lt of the energization of the supply valve solenoid 26, water supply valve 25 is opened and water flows into bottom of the water tank 22. Since this water is cold since the thermostat 31 is located at the top of the er tank 22, the temperature at the upper end might be ı as to hold the contacts of the tank thermostat switch ɔpen. By shunting them by the first set of normally n contacts 111 on energization of the control relay an adequate supply of hot water is assured for the t cycle of operation.

'he energization of the air valve solenoid 47 causes air valve 42 to close the air vent 41. The hot water ʼing in the discharge water line 33 into the surge mber 36 fills the same nearly to the top where the air ;e 40 is formed. The hot water then is forced in the ;tion indicated by the arrow 58 through the auxiliary harge water line 55 downwardly as indicated by the ɔw 59 to the spray head 53. The water sprays from openings 54 over the entire exposed area of the ınd coffee 62 in the filter 63 and thus there is a large ı of contact to promote the coffee making operation. ;e the filter 63 is spaced by the resilient conical wire l 64 from the inner surface of the funnel 69, the 'ee flows rapidly through the filter 63.

'he operation continues, as described, until the quan- of coffee 81 that has flowed into the beaker 79 is icient to overbalance the weight 102 on the lever 98. le switch 103 then is operated and its contacts are ned. Referring to FIGURE 8 it will be observed that opening of the contacts of the scale switch 103 opens holding circuit for the operating winding 114 of the trol relay 110. As a result it is deenergized. The in- ıting lamp 19 is extinguished and the supply valve ɔnoid 26 and air valve solenoid 47 are deenergized. opening of the first set of contacts 111, the control of tank heater 30 is restored to the thermostat 31. No ıitional cold water flows through the intake water line since the water supply valve 25 now is closed. The valve 42 is opened and the air vent 41 permits the ıon to operate in a manner previously described. er a short interval no further flow of coffee takes place ɔugh the discharge opening 72 at the bottom of the nel 69.

t will be understood that the foregoing cycle can be eated as often as desired. The time required for com- ting a cycle will depend upon the position of the ght 102. At the completion of a cycle the beaker 79 ;d with coffee 81 is removed and is placed on an aux- ry heating unit (not shown). The scale heater 83 ; deenergized as soon as the control relay 110 was ɔnergized.

'he funnel 69 can be removed readily by grasping the ıdle 73. All that is necessary to be done to remove coffee grounds and the filter 63 is to turn the funnel upside down over a suitable waste basket. Since the ;r 63 is spaced by the resilient conical wire grill 64 m the inner surface of the funnel 69, none of the fee grounds comes in contact with the funnel 69 and, ıs, it is unnecessary to wash it at the end of each cycle operation.

Figure 9:
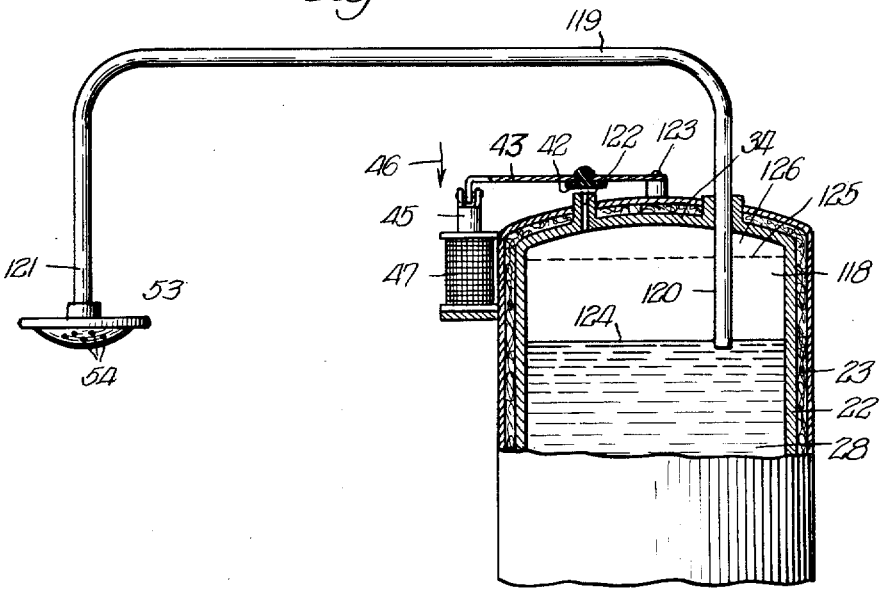
FIGURE 9 is a vertical sectional view showing a modified form of surge chamber arrangement that can be employed in practicing this invention.

FIGURE 9 of the drawings shows a modified arrange- nt of the surge chamber. It will be observed here that upper end 118 of the water tank 22 provides a surge ımber which corresponds to the surge chamber 36 pre- ıusly described. Here a discharge water line 119 inter- ınects the water tank 22 directly with the spray head The intake end 120 of the discharge water line 119 ;ends downwardly into the water tank 22 through the ı 34 while the other end or discharge end 121 of the charge water line 119 has the spray head 53 attached thereto. An air vent 122, corresponding to the air vent 41, is provided in the top 34 of the water tank 22 and is arranged to be closed by the air valve 42 in the manner previously described. In this case the resilient arm 43 is secured at 123 to the upper end 34 of the water tank 22.

On the cessation of flow of cold water to the water tank 22 at the end of the coffee making cycle, the water continues to flow from the water tank 22 through the discharge water line 119 since the latter acts as a siphon on opening of the air valve 42. The flow continues until the water level 124 is lowered to the elevation of the spray head 53, whereupon further flow ceases and no dripping of water takes place at the spray head 53.

On closure of the air valve 42 at the start of a coffee making cycle, the water level 124 rises in the water tank 22 due to the inflow of water in a manner previously described. The water level 124 rises to a location in the vicinity of the broken line 125 and an air space 126 is provided thereabove which corresponds to the air space 40 in the surge chamber 36.

It will be understood that a certain amount of expansion of the water 28 in the water tank 22 takes place as the result of its being heated. This expansion is accommodated by the air spaces 40 and 126, in part. Since the only water valve is the water supply valve 25 and it is located in the intake water line 24, there is no necessity for any other control in the lines which carry hot water. Thus there is no likelihood of a valve in a hot water line being clogged by sediment in the water. The system is inherently safe since it is an open system, rather than a closed system.

The construction shown in FIGURE 9 can be employed in lieu of the corresponding construction shown in FIGURES 1, 2 and 5 of the drawings. Further, it is possible to omit the air valve 42 and associated control parts including the air valve solenoid 47. When this is done, the water tank 22 is filled completely to the top and a slight amount of water leaks out of the air vent 122 because the discharge water line 119 is above the top of the air vent 122 while water sprays out of the opening 54 in the supply head 53 in the manner hereinbefore described. On deenergization of the supply valve solenoid 26 and closure of the water supply valve 25, no additional water is supplied to the water tank 22 and the siphoning takes place as described since the air vent 122 opens to the atmosphere above the spray openings 54 in the spray head 53.

Figure 10:
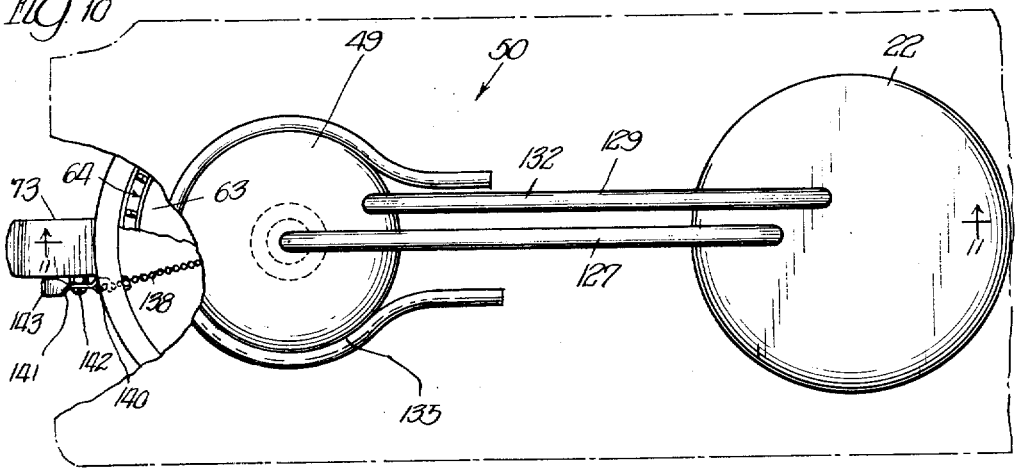
FIGURE 10 is a top plan view of a modified form of the automatic coffee making machine.
Figure 11:
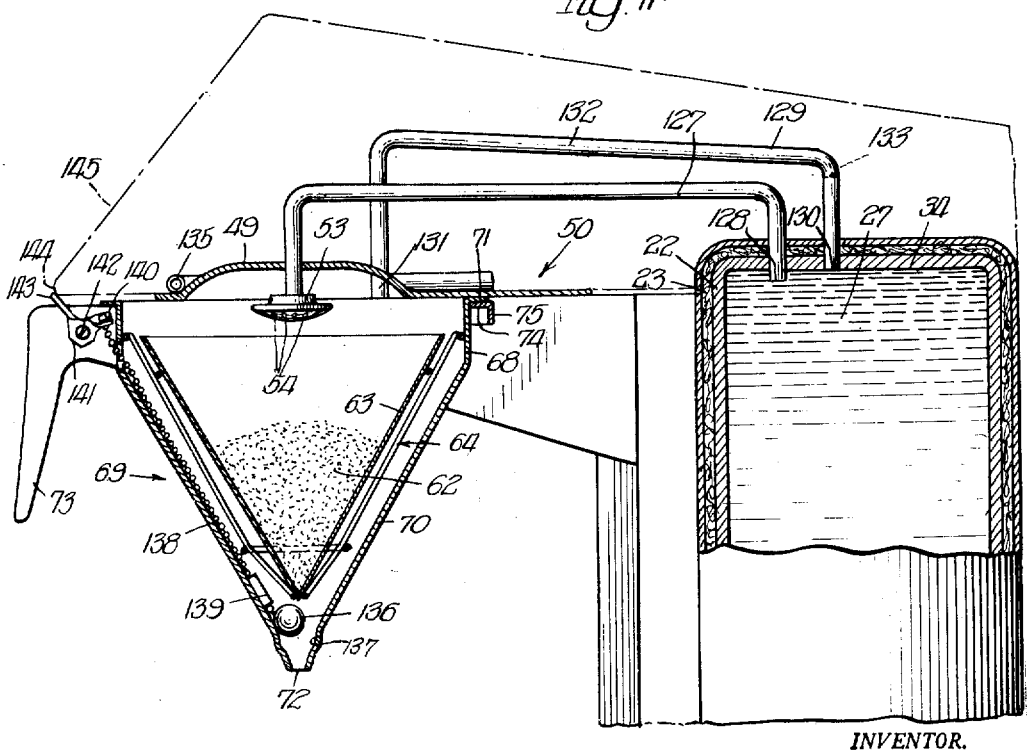
FIGURE 11 is a vertical sectional view taken generally along the line 11—11 of FIGURE 10.

In order to avoid the leak incident to the operation of the construction shown in FIGURE 9 with the air valve 42 omitted, the construction shown in FIGURES 10 and 11 can be employed. Here it will be observed that the water tank 22 is provided with the layer of insulation 23. The spray head 53 is arranged to discharge hot water over the ground coffee 62 in the funnel 69. A discharge water line 127 interconnects the upper end of the water tank 22 with the spray head 53. It will be noted that the intake end 128 of the discharge water line 127 is located above the discharge openings 54 in the spray head 53. Also it will be observed that the intake end 128 extends below the under surface of the top 34 of the water tank 22 a slight distance. In order to provide the siphoning action a siphon tube 129 is employed. It will be noted that it opens through the top 34 of the water tank 22 into the interior thereof and that its intake end 130 may be flush with the under surface of the top 34. The discharge end 131 of the siphon tube 129 opens through the hood 50 over the funnel 69 so that if there should be any discharge through the siphon tube 129, it will be received by the funnel 69. The intermediate portion 132 of the siphon tube 129 is located well above the discharge water line 127. When the hot water is discharging from the spray openings 54 in the spray head 53, the discharge water line 127 of course is filled with hot water. At this time the level of the water in the siphon tube 129 rises to the location indicated by the broken line 133 and, under normal operating conditions, it rises no higher than this. When the water supply valve 25 is closed to prevent further flow of water to the water tank 22, the pressure from the atmosphere applied through the siphon tube 129 to the surface of the water in the water tank 22 causes the siphoning action to continue until the level of the water tank 22 reaches the intake end 128 of the discharge water line 127. Thereupon further discharge from the spray head 53 ceases and no dripping of water takes place from the spray head 53.

It has been found that water tends to condense on the underside of the hood 50 in the vicinity of the upwardly deformed portion 49. In order to avoid this, heat is applied as shown in FIGURES 10 and 11 by means of a hood heater 135. As described hereinafter, the hood heater 135, which is an electrical resistance element, is arranged to be energized together with the tank heater 30 under the control of the tank thermostat switch 32. This is shown diagrammatically in FIGURES 13 and 14 of the drawings.

Figure 12:
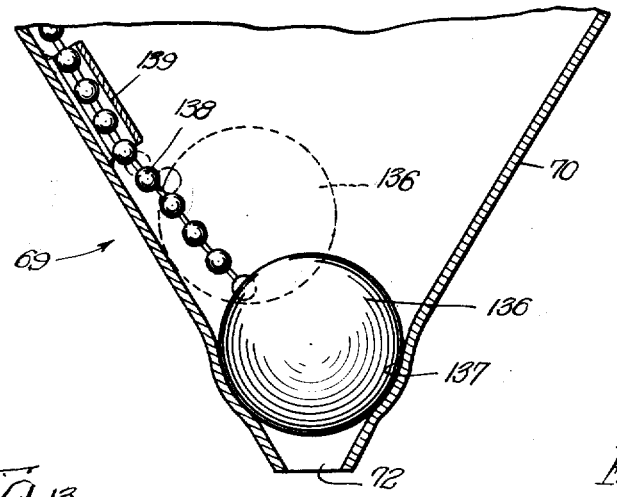
FIGURE 12 is an enlarged vertical sectional view of the lower end of the funnel shown in FIGURE 11 with the ball valve in the closed position.

After the flow of hot water from the spray head 53 ceases, there is likely to be some drip from the discharge opening 72 of the funnel 69. This is due to the fact that some liquid remains in the ground coffee 62 and in the conical filter paper 63. Often it is desirable that the funnel 69 be removed immediately upon cessation of flow of hot water from the spray head 53. Accordingly, a ball valve 136, FIGURES 11 and 12, is provided at the lower end of the conical body portion 70 of the funnel 69. The ball valve 136 is arranged to interfit with a deformed valve surface 137 adjacent the discharge opening 72. The ball valve 136 falls to the position shown in FIGURE 12 upon removal of the funnel 69 from the operative position underneath the spray head 53.

In order to control the position of the ball valve 136 an operator 138 in the form of a flexible chain is provided. The chain 138 extends upwardly through a guide sleeve 139 which is suitably secured to the inner surface of the conical body portion 70 of the funnel 69. At its upper end the chain 138 is connected to one arm 140 of a lever 141 which is pivoted at 142 on the handle 73. The other arm 143 of the lever 141 is arranged, when the funnel 69 is positioned underneath the hood 50, to engage a forward edge 144 of a cover 145 that extends over the hood 50. As soon as the funnel 69 is withdrawn slightly from operative position, the weight of the ball valve 136 swings the lever 141 in a clockwise direction since the other arm 143 is no longer restrained by the forward edge 144 of the cover 145. Accordingly, the ball valve 136 falls to the closed position shown in FIGURE 12 and immediately no further flow of coffee can take place through the discharge opening 72.

Figure 13:
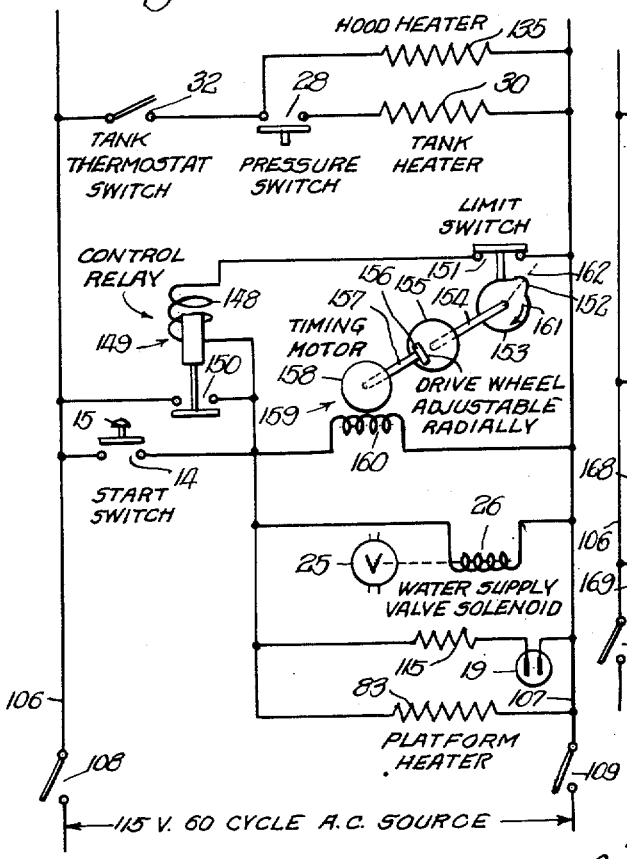
FIGURE 13 illustrates, diagrammatically, a modified circuit that can be employed in practicing this invention.

FIGURE 13 shows a modified circuit arrangement that can be employed in lieu of the circuit arrangement shown in FIGURE 8 of the drawings and without using the air valve solenoid 47. The circuit arrangement shown in FIGURE 8 depended upon the operation of the scale switch 103 on flow of a predetermined weight of coffee to the beaker 79 for deenergizing the supply valve solenoid 26 and closing the water supply valve 25. In the circuit arrangement shown in FIGURE 13 this control function is effected by a timing mechanism which is incorporated in the circuit.

Referring now particularly to FIGURE 13, it will be observed that the tank heater 30 and the hood heater 135 are connected for energization between the line conductors 106 and 107 when the line switches 108 and 109 are closed through the contacts of the tank thermostat switch 32. The pressure switch 28 is provided to insure that the tank heater 30 is not energized in the event that the pressure of the water is below a predetermined value. Also in the system shown in FIGURE 13 there is a winding 148 of a control relay 149 which is provided with normally open contacts 150. When the contacts of the start switch 14 are closed by depressing the bush button 15 a circuit is completed for energizing the winding 148 through normally closed limit switch contacts 151. On energization of the winding 148, the contacts 150 are closed and the winding 148 is sealed in so that the contacts of the start switch 14 can be opened. Upon the closure of the contacts of the start switch 14, in addition to energization of the winding 148, the water supply valve solenoid 26 is energized to open the water supply valve 25 and permit the flow of water to the water tank 22 in the manner previously described. For example the arrangement shown in FIGURE 11 can be utilized or the arrangements in the preceding figures of the drawings can be employed as may be desired. In addition to the energization of the water supply valve solenoid 26 the indicating lamp 19 is energized through the resistor 115 and the scale or platform heater 83 also is energized for maintaining the coffee in the beaker 79 at an elevated temperature.

It is desirable that the contacts of the limit switch 151 be opened at the expiration of a predetermined interval which interval corresponds to the time required for sufficient hot water to flow from the tank 22 through the spray head 53 and fill the beaker 79 to the desired level. Provision is made for opening the contacts of the limit switch 151 through the agency of a cam 152 that is carried by a disc 153 which is mounted on and rotates with a shaft 154. At the other end of the shaft 154 there is a disc 155 which is arranged to be rotated by a drive wheel 156. The drive wheel 156 rotates at a slow speed, such as 1 r.p.m., and its position in variable axially in order to vary the speed at which the disc 155 is driven. Any suitable means well known to those skilled in the art can be employed for changing the position of the drive wheel 156. In order to rotate the drive wheel 156 it is mounted on a shaft 157 which is connected through a suitable gear reduction train to a rotor 158 of a synchronous motor of well known construction that is indicated, generally, at 159. The synchronous motor 159 includes a motor winding 160 which is connected to be energized on closure of the contacts of the start switch 14 and which remains energized together with the other devices by the maintenance of a circuit through the closed contacts 150 of the control relay 149.

In operation, after closure of the contacts of the start switch 14 and completion of the holding circuit through the contacts 150 of the control relay 149, the motor winding 160 is energized and the disc 153 rotates in the direction indicated by the arrow 161 from the start position indicated at 162. The water supply valve 25 is opened in the manner described, the indicating lamp 19 is energized and the platform heater 83 is energized until the cam 152 operates the limit switch contacts 151 to open them and deenergize the winding 148 of the control relay 149. Thereupon the water supply valve solenoid 26 is deenergized and the water supply valve 25 is closed. The indicating lamp 19 is extinguished and the platform heater 83 is deenergized. Also the motor winding 160 is deenergized.

However, the construction of the timing mechanism is such that the disc 153 returns to the position indicated at 162 so that it always starts from the same position.

Figure 14:
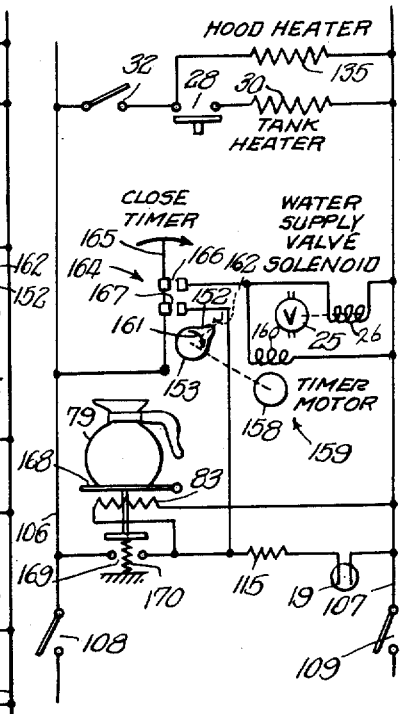
FIGURE 14 illustrates another circuit that can be employed.

FIGURE 14 shows a further modification of the circuit connections that can be employed without the air valve solenoid 47. Here the control for the tank heater 30 and the hood heater 135 are the same as before. The timer motor 159, previously described, is arranged to rotate the disc 153 and it may be in the manner described for FIGURE 13. Here the disc 153 with the cam 152 thereon is arranged to control the operation of a timer switch which is indicated, generally, at 164. The timer switch 164 includes a manually operable arm 165 which is arranged, when moved clockwise, to close contacts 166 and 167. On closure of the contacts 166, a circuit is completed for energizing the water supply valve solenoid 26

) open the water supply valve 25 and initiate the flow of ot water from the tank 22 to the spray head 53 in the ıanner hereinbefore described. In addition the closure f the contacts 166 completes an energizing circuit for the ıotor winding 160 and the rotor 158 begins to rotate the isc 153 in the direction indicated by the arrow 161.

The closure of the contacts 167 completes a circuit for nergizing the indicating lamp 19 through the resistor 115. n addition a circuit is completed for energizing the platorm heater 83 which is located adjacent a movable platorm 168 on which the beaker 79 is positioned underneath he spray head 53.

It is desirable that the platform heater 83 be maintained ·nergized after the coffee making cycle has been comıleted and the water supply valve 25 has been closed. However, it is preferable that the platform heater 83 be ·nergized only at the beginning of the coffee making ·ycle and that it not be energized merely by placing the ›eaker 79 on the movable platform 168. In order to naintain the platform heater 83 energized normally open ·ontacts 169 are provided in parallel with the contacts 167. An adjustable spring 170 serves to hold the contacts 169 open and to hold the movable platform 169 in an elevated position against the weight of the beaker 79 and the weight of the beverage as it is filled. However, the tension of the spring 170 is adjusted so that, when the beaker 79 is partly filled, the contacts 169 are closed. Thus, when the contacts 167 are opened by the timer motor 159 in the manner described, the energizing circuit for the platform heater 83 is maintained through the contacts 169.

In addition the indicating lamp 19 remains energized until the filled beaker 79 is removed. Thereupon the spring 170 opens the contacts 169 and the placing of an empty beaker 79 on the movable platform 168 will not provide sufficient weight to overcome the upward force of the spring 170 and close the contacts 169.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. An automatic coffee making machine comprising, in combination, a frame, a water tank on said frame connected through a supply valve to a supply of water under pressure, *said water tank having a closed top,* means for heating water in said tank, a discharge head mounted on said frame in spaced relation to said water tank having one or more openings for causing hot water supplied thereto to be discharged over a substantial area, siphon means interconnecting the upper end of said water tank and said discharge head [including] *through said closed top including a discharge water line having its intake end opening in said water tank above the central portion thereof and* an air vent, an air valve for closing said air vent, means underneath said discharge head for receiving ground coffee to be covered by hot water from said discharge head, a beaker below said coffee receiving means for receiving coffee extract therefrom, and means for closing said air valve and opening said supply valve to cause [hot water] *water heated by said heating means to flow concurrently through said discharge water line to said discharge head* to cover said ground coffee and coffee extract to flow into said beaker.

2. An automatic coffee making machine comprising, in combination, a frame, a water tank on said frame connected through a supply valve to a supply of water under pressure, means for heating water in said water tank, a discharge head mounted on said frame in spaced relation to said water tank having one or more openings for causing hot water supplied thereto to be discharged over a substantial area, siphon means interconnecting the upper end of said water tank and said discharge head including an air vent, an air valve for closing said air vent, means underneath said discharge head for receiving ground coffee to be covered by hot water from said discharge head, a beaker below said ground coffee receiving means for receiving coffee extract therefrom, scale means supporting said beaker, and means responsive to placement of an empty beaker on said scale means for closing said air valve and opening said supply valve to cause hot water to cover said ground coffee and coffee extract to flow into said beaker.

3. An automatic coffee making machine comprising, in combination, a frame, a water tank on said frame connected through a supply valve to a supply of water under pressure, means for heating water in said water tank, a discharge head mounted on said frame in spaced relation to said water tank having one or more openings for causing hot water supplied thereto to be discharged over a substantial area, siphon means interconnecting the upper end of said water tank and said discharge head including an air vent, an air valve for closing said air vent, means underneath said discharge head for receiving ground coffee to be covered by hot water from said discharge head, a beaker below said ground coffee receiving means for receiving coffee extract therefrom, scale means supporting said beaker, means for closing said air valve and opening said supply valve to cause hot water to cover said ground coffee and coffee extract to flow into said beaker, and means responsive to the filling of said beaker with coffee to a predetermined extent and thereby operation of said scale means for opening said air valve and closing said supply valve.

4. An automatic coffee making machine comprising, in combination, a frame, a water tank on said frame connected through a supply valve to a supply of water under pressure, means for heating water in said water tank, a spray head mounted on said frame in spaced relation to said water tank having openings for causing hot water supplied thereto to be sprayed downwardly over a substantial area, means providing a surge chamber between the surface of the water in said water tank and said spray head, said surge chamber being located above said openings in said spray head, a discharge water line interconnecting said surge chamber from a level therein substantially below the top thereof and said spray head, said surge chamber having an air vent in the top, an air valve for closing said air vent, means underneath said spray head for receiving ground coffee to be sprayed by hot water from said spray head, a beaker below said ground coffee receiving means for receiving coffee extract therefrom, and means for closing said air valve and opening said supply valve to cause hot water to spray over said ground coffee and coffee extract to flow into said beaker.

5. An automatic coffee making machine comprising, in combination, a frame, a water tank on said frame connected through a supply valve to a supply of water under pressure, means for heating water in said tank, a spray head mounted on said frame in spaced relation to said water tank having openings for causing hot water supplied thereto to be sprayed downwardly over a substantial area, means providing a surge chamber between the surface of the water in said water tank and said spray head, said surge chamber being located above said openings in said spray head, a discharge water line interconnecting said surge chamber from a level therein substantially below the top thereof and said spray head whereby on cessation of flow of water to said water tank water in said surge chamber is siphoned out of the same, said surge chamber having an air vent in the top, an air valve for closing said air vent, means underneath said spray head for receiving ground coffee to be sprayed by hot water from said spray head, a beaker below said ground coffee receiving means for receiving coffee extract therefrom, scale means supporting said beaker, means for closing said air valve and opening said supply valve to cause hot water to spray over said ground coffee and coffee extract to flow into said beaker, and means responsive to the filling of said beaker with coffee extract to a predetermined extent and thereby operation of said scale means for opening said air valve and closing said supply valve.

6. An automatic coffee making machine comprising, in combination, a frame, a water tank on said frame connected through a supply valve to a supply of water under pressure, means for heating water in said water tank, a spray head mounted on said frame in spaced relation to said water tank having openings for causing hot water supplied thereto to be sprayed downwardly over a substantial area, means providing a surge chamber between the surface of the water in said water tank and said spray head, said surge chamber being located above said openings in said spray head, a discharge water line interconnecting said surge chamber from a level therein substantially below the top thereof and said spray head whereby on cessation of flow of water to said water tank in said surge chamber water is siphoned out of the same, said surge chamber having an air vent in the top, an air valve for closing said air vent, means underneath said spray head for receiving ground coffee to be sprayed by hot water from said spray head, a beaker below said ground coffee receiving means for receiving coffee extract therefrom, scale means supporting said beaker, means responsive to placing an empty beaker on said scale means for closing said air valve and opening said supply valve to cause hot water to spray over said ground coffee and coffee extract to flow into said beaker, and means responsive to the filling of said beaker with coffee extract to a predetermined extent for opening said air valve and closing said supply valve.

7. An automatic coffee making machine comprising, in combination, a frame, a water tank on said frame connected through a supply valve to a supply of water under pressure, means for heating water in said water tank, a spray head mounted on said frame in spaced relation to said water tank having openings for causing hot water supplied thereto to be sprayed downwardly over a substantial area, siphon means interconnecting the upper end of said water tank and said spray head including an air vent, an air valve for closing said air vent, means underneath said spray head for receiving ground coffee to be sprayed by hot water from said spray head, a beaker below said ground coffee receiving means for receiving coffee extract therefrom, a scale beam supporting said beaker, said scale beam being bifurcated at one end with one arm pivotally supported by said frame and the other arm pivotally and slidably supported by said frame, a spring secured to said frame and biasing said other arm upwardly, means biasing the other end of said scale beam upwardly, means responsive to downwardly movement of said other arm as a result of placement of an empty beaker on said scale beam for closing said air valve and opening said supply valve to cause hot water to spray over said ground coffee and coffee extract to flow into said beaker, and means responsive to the filling of said beaker with coffee extract to a predetermined extent for overcoming the biasing means at said other end of said scale beam for opening said air valve and closing said supply valve.

8. An automatic coffee making machine comprising, in combination, a frame, a water tank on said frame connected through a solenoid operated supply valve to a supply of water under pressure, means for heating the water in said water tank, a spray head mounted on said frame in spaced relation to said water tank having openings for causing hot water supplied thereto to be sprayed downwardly over a substantial area, siphon means interconnecting the upper end of said water tank and said spray head including an air vent, a solenoid operated air valve for closing said air vent, means underneath said spray head for receiving ground coffee in position to be sprayed by hot water from said spray head, a beaker below said ground coffee receiving means for receiving coffee extract therefrom, a scale beam supporting said beaker, and pivotally supported by said frame, means biasing said scale beam upwardly, a scale switch on said frame operated by said scale beam in response to a predetermined quantity of coffee extract in said beaker, means for connecting the supply valve solenoid and the air valve solenoid for energization to a source of electric current to open said supply valve and close said air valve, and means responsive to operation of said scale switch as a result of the flow of a predetermined quantity of coffee extract into said beaker for effecting deenergization of said supply valve solenoid and of said air valve solenoid and closing of said supply valve and opening of said air valve.

9. An automatic coffee making machine comprising, in combination, a frame, a water tank on said frame connected through a solenoid operated supply valve to a supply of water under pressure, means for heating the water in said water tank, a surge chamber on said frame having an air vent at the top and the bottom of said surge chamber above the top of said water tank, a solenoid operated air valve for closing said air vent to said surge chamber, a discharge water line interconnecting the top of said water tank and the top of said surge chamber, an auxiliary discharge water line having an intake opening near said bottom of said surge chamber and extending above said top of said surge chamber and acting as a siphon on cessation of flow of hot water in said discharge water line, a spray head at the discharge end of said auxiliary discharge water line having openings for causing the hot water to be sprayed downwardly over a substantial area, means underneath said spray head for receiving ground coffee in position to be sprayed by hot water from said spray head, a beaker below said ground coffee receiving means for receiving coffee extract therefrom, a scale beam supporting said beaker and pivotally supported by said frame, means biasing said scale beam upwardly, a scale switch on said frame operated by said scale beam in response to a predetermined quantity of coffee extract in said beaker, means for connecting the supply valve solenoid and the air valve solenoid for energization to a source of electric current to open said supply valve and close said air valve, and means responsive to operation of said scale switch as a result of the flow of a predetermined quantity of coffee extract into said beaker for effecting deenergization of said supply valve solenoid and of said air valve solenoid and closing of said supply valve and opening of said air valve.

10. An automatic coffee making machine comprising, in combination, a frame, a water tank on said frame connected through a supply valve to a supply of water under pressure, means for heating water in said water tank, the upper end of said water tank providing a surge chamber and having an air vent at the top, a discharge water line extending into said water tank and opening at the intake end into the same at the bottom of said surge chamber, a spray head at the discharge end of said water line having openings for causing the hot water to be sprayed downwardly over a substantial area, said openings being located at the level of the bottom of said surge chamber whereby on cessation of flow of water to said water tank water in said surge chamber is siphoned out of the same, means underneath said spray head for receiving ground coffee to be sprayed by hot water from said spray head, a beaker below said ground coffee receiving means for receiving coffee extract therefrom, scale means supporting said beaker, means for closing said air valve and opening said supply valve to cause hot water to spray over said ground coffee and coffee extract to flow into said beaker, and means responsive to the filling of said beaker with coffee extract to a predetermined extent and thereby operation of said scale means for opening said air valve and closing said supply valve.

11. An automatic coffee making machine comprising, in combination, a frame, a water tank on said frame connected through a solenoid operated supply valve to a supply of water under pressure, means for heating the water in said water tank, the upper end of said water tank providing a surge chamber and having an air vent at the top, a solenoid operated air valve for closing said air vent to said surge chamber, a discharge water line extending into said water tank and opening at the intake end into the same at the bottom of said surge chamber, a spray head at the discharge end of said water line having openings for causing the hot water to be sprayed downwardly over a substantial area, said openings being located at the level of the bottom of said surge chamber, means underneath said spray head for receiving ground coffee in position to be sprayed by hot water from said spray head, a beaker below said ground coffee receiving means for receiving coffee extract therefrom, a scale beam supporting said beaker and pivotally supported by said frame, means biasing said scale beam upwardly, a scale switch on said frame operated by said scale beam in response to a predetermined quantity of coffee extract in said beaker, means for connecting the supply valve solenoid and the air valve solenoid for energization to a source of electric current to open said supply valve and close said air valve, and means responsive to operation of said scale switch as a result of the flow of a predetermined quantity of coffee extract into said beaker for effecting deenergization of said supply valve solenoid and of said air valve solenoid and closing of said supply valve and opening of said air valve.

12. An automatic coffee making machine comprising, in combination, a frame, an insulated water tank on said frame connected through a solenoid operated supply valve to a supply of water under pressure, a pressure switch connected to said supply of water having contacts held closed under predetermined pressure, an electric heating element in said water tank connected for energization to a source of electric current through said contacts of said pressure switch, a thermostat in said water tank operating a tank thermostat switch the contacts of which are interposed in the circuit to said electric heating element and are operated by said thermostat to maintain the water in said water tank at a predetermined temperature, the upper end of said water tank providing a surge chamber and having an air vent at the top, a solenoid operated air valve for closing said air vent to said surge chamber, a discharge water line extending into said water tank and opening at the intake end into the same at the bottom of said surge chamber, a spray head at the discharge end of said water line having openings for causing the hot water to be sprayed downwardly over a substantial area, said openings being located at the level of the bottom of said surge chamber, means underneath said spray head for receiving ground coffee in position to be sprayed by hot water from said spray head, a beaker below said ground coffee receiving means for receiving coffee extract therefrom, a scale beam supporting said beaker and pivotally supported by said frame, means biasing said beam upwardly, a scale switch on said frame having normally closed contacts and operated by said scale beam in response to a predetermined quantity of coffee extract in said beaker to open its contacts; a control relay having first and second sets of normally open contacts, and an operating winding; a normally open start switch on said frame, circuit means connecting said operating winding for initial energization through the contacts of said start switch and for maintaining said operating winding energized through said normally closed contacts of said scale switch and through said second set of relay contacts when closed on opening of said start switch, circuit means connecting the supply valve solenoid and the air valve solenoid in parallel circuit relation and in series circuit relation with said second set of relay contacts and circuit means connecting said first set of contacts in parallel with said contacts of said tank thermostat switch.

13. An automatic coffee making machine comprising, in combination, a water tank connected through a supply valve to a supply of water under pressure, *said water tank having a closed top,* means for heating water in said tank, a discharge head mounted in spaced relation to said water tank having one or more openings for causing hot water supplied thereto to be discharged over a substantial area, siphon means interconnecting the upper end of said water tank and said discharge head [including] *through said closed top including a discharge water line having its intake end opening in said water tank above the central portion thereof and* an air vent placing said upper end of said water tank in communication with the atmosphere at a location above the level at which water is discharged from said head, means underneath said discharge head for receiving ground coffee to be covered by hot water from said dischareg head, a beaker below said coffee receiving means for receiving coffee extract therefrom, and means for opening said supply valve to cause [hot water] *water heated by said heating means to flow concurrently through said discharge water line to said discharge head* to cover said ground coffee and coffee extract to flow into said beaker.

14. An automatic coffee making machine comprising, in combination, a water tank connected through a supply valve to a supply of water under pressure, means for heating water in said tank, a discharge head mounted in spaced relation to said water tank having one or more openings for causing hot water supplied thereto to be discharged over a substantial area, siphon means interconnecting the upper end of said water tank and said discharge head including a discharge water line providing a connection between said upper end of said water tank and said discharge head and an air vent line extending above said discharge water line through which water normally does not flow and in which the water level under normal operating conditions is the same as the highest level of the water in said discharge water line, means underneath said discharge head for receiving ground coffee to be covered by hot water from said discharge head, a beaker below said coffee receiving means for receiving coffee extract therefrom, and means for opening said supply valve to cause hot water to cover said ground coffee and coffee extract to flow into said beaker and for subsequently closing said supply valve, said air vent line providing direct communication between said water tank and the atmosphere at all times and limiting the pressure that can be created in said water tank to atmospheric pressure and the siphon action preventing further flow of water through said discharge water line and further discharge of water from said discharge head after closure of said supply valve and the water in said tank has been discharged to the level of the intake end of said discharge water line in said tank.

15. An automatic coffee making machine comprising, in combination, a water tank connected through a supply valve to a supply of water under pressure, means for heating water in said tank, a discharge head mounted in spaced relation to said water tank having one or more openings for causing hot water supplied thereto to be discharged over a substantial area, siphon means interconnecting the upper end of said water tank and said discharge head including a discharge water line providing a connection between said upper end of said water tank and said discharge head and an air vent line extending above said discharge water line and placing the upper end of said water tank in communication with the atmosphere whereby on cessation of flow of water to said water tank atmospheric pressure causes the flow of water to said discharge head to continue until the vacuum within said tank is broken, said air vent line opening to the atmosphere in the vicinity of said discharge head, means underneath said discharge head for receiving ground coffee to be covered by hot water from said discharge head and any discharge from said air vent line, a beaker below said coffee receiving means for receiving coffee extract therefrom, and means for opening said supply valve to cause hot water to cover said ground coffee and coffee extract to flow into said beaker and for subsequently closing said supply valve, said air vent line providing direct communication between said water tank and the atmosphere at all times and limiting the pressure that can be created in said water tank to atmospheric pressure and the siphon action preventing further flow of water through said discharge water line and further discharge of water from said discharge head after closure of said supply valve and the water in said tank has been discharged to the level of the intake end of said discharge water line in said tank.

16. An automatic coffee making machine comprising, in combination, a water tank connected through a supply valve to a supply of water under pressure, means for heating water in said tank, a discharge head mounted in spaced relation to said water tank having one or more openings for causing hot water supplied thereto to be discharged over a substantial area, siphon means interconnecting the upper end of said water tank and said discharge head including a discharge water line providing a connection between the upper end of said water tank and said discharge head and an air vent through which water under normal operating conditions does not flow placing said upper end of said water tank in communication with the atmosphere at a location above the level at which water is discharged from said head whereby on cessation of flow of water to said water tank atmospheric pressure causes the flow of water to said discharge head to continue until the vacuum within said tank is broken, means underneath said discharge head for receiving ground coffee to be covered by hot water from said discharge head, a beaker below said coffee receiving means for receiving coffee extract therefrom, means for opening said supply valve to cause hot water to cover said ground coffee and coffee extract to flow into said beaker, and means for closing said supply valve a predetermined time after it is opened, said air vent providing direct communication between said water tank and the atmosphere at all times and limiting the pressure that can be created in said water tank to atmospheric pressure and the siphon action preventing further flow of water through said discharge water line and further discharge of water from said discharge head after closure of said supply valve and the water in said tank has been discharged to the level of the intake end of said discharge water line in said tank.

17. The invention as set forth in claim 16 wherein the means for closing the supply valve is a motor driven timer that is initiated in operation when the supply valve is opened.

18. An automatic coffee making machine comprising, in combination, a water tank connected through a supply valve to a supply of water under pressure, means for heating water in said tank, a discharge head mounted in spaced relation to said water tank having one or more openings for causing hot water supplied thereto to be discharged over a substantial area, siphon means interconnecting the upper end of said water tank and said discharge head including an air vent placing said upper end of said water tank in communication with the atmosphere at a location above the level at which water is discharged from said head, a hood overlying said discharge head, means for heating said hood to avoid condensation of moisture on the under side thereof, means underneath said discharge head and hood for receiving ground coffee to be covered by hot water from said discharge head, a beaker below said coffee receiving means for receiving coffee extract therefrom, and means for opening said supply valve to cause hot water to cover said ground coffee and coffee extract to flow into said beaker.

19. An automatic coffee making machine comprising, in combination, a water tank connected through a supply valve to a supply of water under pressure, means for heating water in said tank, a discharge head mounted in spaced relation to said water tank having one or more openings for causing hot water supplied thereto to be discharged over a substantial area, siphon means interconnecting the upper end of said water tank and said discharge head including a discharge water line providing a connection between said upper end of said water tank and said discharge head and an air vent line extending above said discharge water line, a hood overlying said discharge head, means for heating said hood to avoid condensation of moisture on the under side thereof, means underneath said discharge head and hood for receiving ground coffee to be covered by hot water from said discharge head, a beaker below said coffee receiving means for receiving coffee extract therefrom, and means for opening said supply valve to cause hot water to cover said ground coffee and coffee extract to flow into said beaker.

20. An automatic coffee making machine comprising, in combination, a frame, a water tank on said frame connected through a supply valve to a supply of water under pressure, means for heating water in said water tank, the upper end of said water tank having an air vent, a discharge water line extending into said water tank and opening at the intake end into the same at the top thereof, a spray head at the discharge end of said water line having openings for causing the hot water to be sprayed downwardly over a substantial area, said openings being located no higher than the level of said intake end of said water line whereby on cessation of flow of water to said water tank water is siphoned out of the same, means underneath said spray head for receiving ground coffee to be sprayed by hot water from said spray head, a beaker below said ground coffee receiving means for receiving coffee extract therefrom, scale means supporting said beaker, means for opening said supply valve to cause hot water to spray over said ground coffee and coffee extract to flow into said beaker, and means responsive to the filling of said beaker with coffee extract to a predetermined extent and thereby operation of said scale means for closing said supply valve.

21. An automatic coffee making machine comprising, in combination, a frame, a water tank on said frame connected through a supply valve to a supply of water under pressure, means for heating water in said water tank, the upper end of said water tank having an air vent, a discharge water line extending into said water tank and opening at the intake end into the same at the top thereof, a spray head at the discharge end of said water line having openings for causing the hot water to be sprayed downwardly over a substantial area, said openings being located no higher than the level of said intake end of said water line whereby on cessation of flow of water to said water tank water is siphoned out of the same, means underneath said spray head for receiving ground coffee to be sprayed by hot water from said spray head, a beaker below said ground coffee receiving means for receiving coffee extract therefrom, means for opening said supply valve to cause hot water to spray over said ground coffee and coffee extract to flow into said beaker, and motor driven timer means for closing said supply valve a pretermined time after it is opened.

22. A coffee making machine comprising, in combination, a water tank, a supply valve, means connecting said water tank through said supply valve to a source of water under pressure, means for heating water in said tank, a discharge head mounted in spaced relation to said water tank for causing hot water supplied thereto to be discharged therefrom, siphon means interconnecting said water tank and said discharge head including a discharge water line providing a connection between said water tank and said discharge head and an air vent line extending above said discharge water line through which water does not normally flow and in which the water level under normal operating conditions is the same as the highest level of the water in said discharge water line, means associated with said discharge head for receiving ground coffee to have applied thereto hot water from said discharge head, a beaker associated with said coffee receiving means for receiving coffee extract therefrom, a solenoid for operating said supply valve, manually operable switch means for connecting said solenoid for emergization to a source of electric current, a relay having an operating winding connected to be energized from said current source on closure of said manually operable switch means and normally open contacts connected in shunt circuit relation with said manually operable switch means for maintaining completed the energizing circuits for said selenoid and said operating winding on opening of said manually operable switch means, normally closed timer contact means connected in series circuit relation with said operating winding, a timing motor operatively connected to said timer contact means for opening the same a predetermined time after energization of said timing motor, and circuit means connecting said timing motor for energization to said current source on closure of said manually operable switch means said air vent line providing direct communication between said water tank and the atmosphere at all times and limiting the pressure that can be created in said water tank to atmospheric pressure and the siphon action preventing further flow of water through said discharge water line and further discharge of water from said discharge head after closure of said supply valve and the water in said tank has been discharged to the level of the intake end of said discharge water line in said tank.

*23. An automatic coffee making machine comprising, in combination, a water tank having a closed top, means for heating water in said tank, a discharge head mounted in spaced relation to said water tank having one or more openings for causing hot water supplied thereto to be discharged over a substantial area, siphon means interconnecting the upper end of said water tank and said discharge head including a discharge water line having its intake end opening in said water tank above the central portion thereof and an air vent line opening to the atmosphere above said closed top at all times to limit the pressure that can be created in said water tank to atmospheric pressure, means underneath said discharge head for receiving ground coffee to be covered by hot water from said discharge head, a beaker below said coffee receiving means for receiving coffee extract therefrom, and means for supplying water to said water tank to cause water heated by said heating means to flow concurrently through said discharge water line to said discharge head to cover said ground coffee and coffee extract to flow into said beaker.*

*24. An automatic coffee making machine comprising, in combination, a water tank, means for heating water in said tank, a discharge head mounted in spaced relation to said water tank having one or more openings for causing hot water supplied thereto to be discharged over a substantial area, siphon means interconnecting the upper end of said water tank and said discharge head including a discharge water line providing a connnection between said upper end of said water tank and said discharge head and an air vent line extending above said discharge water line, through which water does not normally flow and in which the water level under normal operating conditions is the same as the highest level of water in said discharge water line, means underneath said discharge head for receiving ground coffee to be covered by hot water from said discharge head, a beaker below said coffee receiving means for receiving coffee extract therefrom, and means for supplying water to said water tank to cause hot water to cover said ground coffee and coffee extract to flow into said beaker, said air vent line providing direct communication between said water tank and the atmosphere at all times and limiting the pressure that can be created in said water tank to atmospheric pressure and the siphon action preventing further flow of water through said discharge water line and further discharge of water from said discharge head after the water in said tank has been discharged to the level of the intake end of said discharge water line in said tank.*

*25. An automatic coffee making machine comprising, in combination, a water tank, means for heating water in said tank, a discharge head mounted in spaced relation to said water tank having one or more openings for causing hot water supplied thereto to be discharged over a substantial area, siphon means interconnecting the upper end of said water tank and said discharge head including an air vent placing said upper end of said water tank in communication with the atmosphere at a location above the level at which water is discharged from said head, a hood overlying said discharge head, means for heating said hood to avoid condensation of moisture on the under side thereof, means underneath said discharge head and hood for receiving ground coffee to be covered by hot water from said discharge head, a beaker below said coffee receiving means for receiving coffee extract therefrom, and means for supplying water to said water tank to cause hot water to cover said ground coffee and coffee extract to flow into said beaker.*

*26. An automatic coffee making machine comprising, in combination, a water tank, means for heating water in said tank, a discharge head mounted in spaced relation to said water tank having one or more openings for causing hot water supplied thereto to be discharged over a substantial area, siphon means interconnecting the upper end of said water tank and said discharge head including a discharge water line providing a connnection between said upper end of said water tank and said discharge head and an air vent line extending above said discharge water line, a hood overlying said discharge head, means for heating said hood to avoid condensation of moisture on the under side thereof, means underneath said discharge head and hood for receiving ground coffee to be covered by hot water from said discharge head, a beaker below said coffee receiving means for receiving coffee extract therefrom, and means for supplying water to said water tank to cause hot water to cover said ground coffee and coffee extract to flow into said beaker.*

References Cited by the Examiner

The following references, cited by the examiner, are of record in the patented file of this patent or the original patent

UNITED STATES PATENTS

| | | | |
|---|---|---|---|
| D. 78,353 | 4/29 | Herring | D44—26 |
| 162,294 | 4/75 | Leiner | 210—485 |
| 189,929 | 4/77 | Fenner | 210—455 |
| 563,464 | 7/96 | Fahrney. | |
| 975,874 | 11/10 | Korn et al. | 210—484 |
| 2,088,966 | 8/37 | Lyons. | |
| 2,273,422 | 2/42 | Schroeder | 210—477 |
| 2,346,389 | 4/44 | Peters | 99—282 |
| 2,359,943 | 10/44 | Schlumbohn. | |
| 2,371,328 | 3/45 | Herrera | 99—282 |
| 2,507,633 | 5/50 | Hill | 99—307 |
| 2,529,672 | 11/50 | Black | 99—282 |
| 2,551,219 | 5/51 | Peters et al. | 99—282 |
| 2,561,134 | 7/51 | Peters. | |
| 2,737,880 | 3/56 | Johnson | 99—282 |
| 2,761,200 | 9/56 | Arnett | 99—283 |
| 2,796,018 | 6/57 | Stiebel | 99—283 |
| 2,827,927 | 3/58 | Findlay | 141—83 |
| 2,835,782 | 5/58 | Stiebel. | |
| 2,839,988 | 6/58 | Tritt | 99—282 |

FOREIGN PATENTS 28,691 12/09 Great Britain.

ROBERT E. PULFREY, *Primary Examiner.*